May 2, 1961           D. N. HUNTER           2,982,671

IMPREGNATED CARBON SEALS

Filed Feb. 19, 1958

INVENTOR
DONALD N. HUNTER

BY
Watson, Cole, Grindle & Watson
ATTORNEY

United States Patent Office 2,982,671
Patented May 2, 1961

2,982,671

IMPREGNATED CARBON SEALS

Donald N. Hunter, Streatley, near Luton, England, assignor to D. Napier & Son Limited, London, England, a British company Filed Feb. 19, 1958, Ser. No. 716,227

Claims priority, application Great Britain Feb. 21, 1957

2 Claims. (Cl. 117—61)

The present invention relates to carbon seals of the kind used to provide a fluid seal between two relatively moving surfaces and to the impregnation of such seals to render them impervious, in particular to hydrogen peroxide.

Carbon seals, usually in the form of graphite, are usually to some extent porous. A further difficulty is that the fluid may be corrosive, producing chemical actions in the carbon.

When the fluid consists of "high test" hydrogen peroxide (that is to say hydrogen peroxide of high concentration) or its decomposition products further difficulties arise due to the high temperatures concerned.

According to the present invention a method of making a carbon seal of the kind referred to substantially impervious to fluid, comprises impregnating the carbon body with a vinyl-cyclic amine, and then polymerizing the impregnating material in situ by the application of heat.

The impregnating material is preferably the monomer N-vinyl carbazole, which is cured by heating to form the resin polyvinyl carbazole.

A preferred method according to the invention comprises placing the carbon body on a block of solid impregnating material in an air tight container, applying a vacuum to the chamber, heating the chamber sufficient to cause the impregnating material to melt and allow the carbon body to sink into it, releasing the vacuum and pressurising the chamber, and removing the impregnated carbon body from the chamber and heating it until the impregnating material is fully polymerised.

The vacuum is preferably between 5 mm. to 0.5 mm. and is applied to the chamber for a period of at least 5 hours, the pressure applied after the vacuum is released being preferably of approximately 80 pounds per square inch for a period of from 1 to 2 hours. According to a further preferred feature of the invention the pressurizing gas is free from oxygen and may for example be nitrogen.

A carbon seal according to the invention thus comprises a porous carbon body impregnated with a vinyl-cyclic amine which has been polymerised in situ.

Carbon seals according to the invention may be utilised for various purposes but are particularly suitable for use in combination with fluid operated rotary machines employing high test hydrogen peroxide or its de-composition products (hydrogen peroxide steam).

Figure 1:
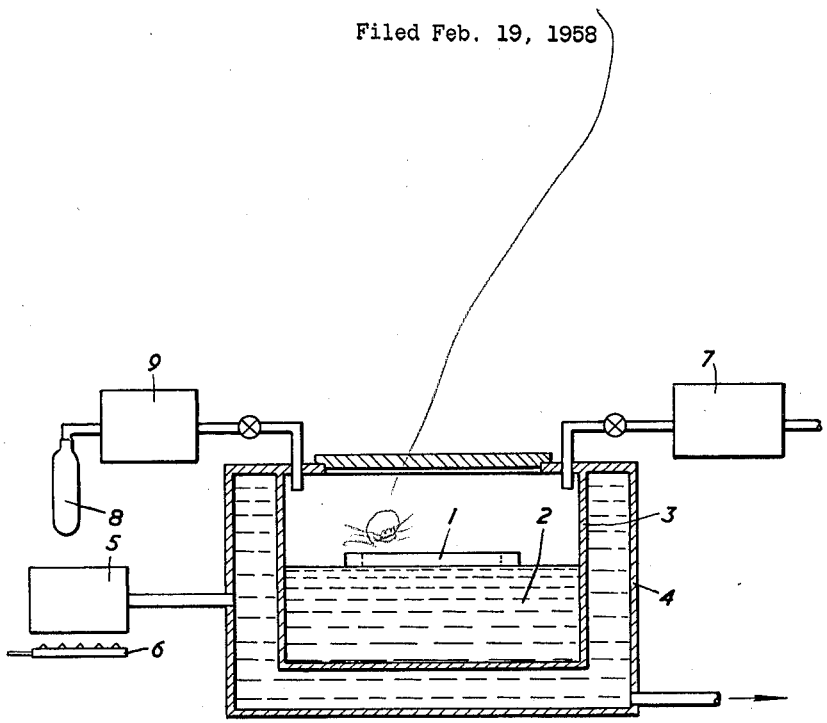
Figure 2:
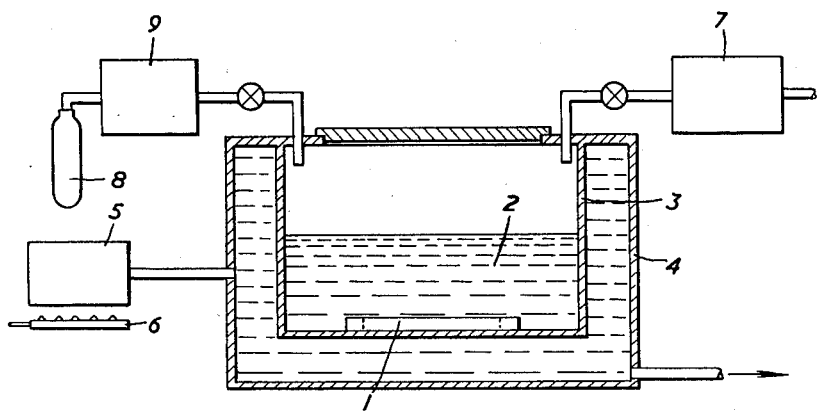

The invention may be performed in various ways which will now be described by way of example with reference to the accompanying drawings in which:

Figure 1 shows a diagrammatic representation of a chamber in which a carbon seal may be impregnated together with its accompanying accessories and with the carbon body in position above the solid impregnating material prior to the application of heat, and Figure 2 shows the same equipment as in Figure 1 after heat has been applied.

In the example to be described the carbon seal is in the form of a ring machined to provide a slightly oversize interference fit in an annular recess provided in its intended metal housing. The carbon ring, referred to herein as the carbon body 1, is placed on a block of solid vinyl-carbazole monomer 2 in an air-tight impregnation chamber 3 as shown in Figure 1. The chamber is surrounded by a water jacket 4 the water in which can be heated by means of a boiler 5 heated by a gas burner 6. It will be appreciated that the water in the water jacket 4 may be heated by any convenient method and that the arrangement described herein is only by way of example. The chamber is now sealed and the air removed by means of a vacuum pump 7, and a vacuum of between 5 mm. to 0.5 mm. mercury is applied to the chamber for a period of at least 5 hours to extract the major part of the air included in the pores of the carbon body 1.

The water in the water jacket 4 is now heated to a temperature of 90° C. to 100° C. by means of the boiler 5, which causes the vinyl-carbazole to melt to a thin fluid state so that the carbon body 1 sinks into the liquid as shown in Figure 2. After the carbon body has sunk in to the vinyl-carbazole the vacuum is released and nitrogen from a nitrogen bottle 8 is pumped into the chamber 3 by a high pressure pump 9. The pressure is maintained at approximately 80 pounds per square inch for about 2 hours, which forces the liquid into the pores of the carbon. During this pressurizing step the vinyl-carbazole must be kept in the liquid state by maintaining the temperature of the water in the water jacket 4, but the duration of this step in the process is limited by the time during which the monomer will tolerate this heat without being polymerised. If compressed air or an oxygen containing gas is used the pressuring time may have to be shortened.

After this treatment the carbon body 1 is removed from the chamber and heated in an oven at 100° C. until the vinyl carbazole is fully polymerised. After any necessary final machining process the seal is ready to be inserted into its housing.

The vinyl-carbazole monomer is solid at room temperature but melts into a thin mobile fluid at 60° C. and in this condition it is ideal for impregnation. Furthermore it contains substantially 100 percent reactive material and there are no volatiles to be disposed of during polymerisation and therefore the danger of creating voids in the seal is minimised. The impregnated seal according to the invention is substantially impervious to fluid, and moreover the life of the seal is prolonged since the impregnation tends to prevent chemical action in the carbon and also provides an improved resistance to scouring. Furthermore in certain circumstances such as when the fluid is "high test" hydrogen peroxide, for example when used in a rotary machine of the kind now to be described, the impregnation tends to prevent catalytic decomposition of the fluid due to the proximity of the exposed carbon surfaces.

What I claim as my invention and desire to secure by Letters Patent is:

1. A carbon seal comprising a porous carbon body impregnated with N-vinyl carbazole, which has been polymerized in situ.

2. A method of making a carbon seal substantially impervious to fluid which includes the steps of placing a carbon body on a block of solid N-vinyl carbazole impregnating material in an air-tight chamber, applying a vacuum to the chamber, heating the chamber sufficiently to cause the impregnating material to melt and allow the carbon body to sink into it, releasing the vacuum and pressurizing the chamber, and removing from the chamber the impregnated carbon body and heating the said body until the impregnating material is fully polymerized.

References Cited in the file of this patent

UNITED STATES PATENTS

| | | |
|---|---|---|
| 1,756,323 | Wilfley | Apr. 29, 1930 |
| 2,027,505 | Winkler | Jan. 14, 1936 |
| 2,174,887 | Kiefer | Oct. 3, 1939 |
| 2,554,254 | Kroft | May 22, 1951 |
| 2,561,132 | Payne | July 17, 1951 |
| 2,682,626 | Robinson et al. | June 29, 1954 |

OTHER REFERENCES

"Karbate," centrifugal pumps, catalog section S–7200; March 1951, Union Carbide and Carbon Division, New York, N.Y.

Schildknecht: "Vinyl and Related Polymers," 1952, John Wiley and Sons, Inc., page 656.